United States Patent [19]
Meyer et al.

[11] Patent Number: 4,527,669
[45] Date of Patent: Jul. 9, 1985

[54] FRICTION PAD ASSEMBLIES FOR USE IN DISC BRAKES

[75] Inventors: Carl Meyer; Hans G. Madzgalla, both of Koblenz, Fed. Rep. of Germany

[73] Assignee: Lucas Industries Limited, Birmingham, England

[21] Appl. No.: 601,118

[22] Filed: Apr. 18, 1984

Related U.S. Application Data

[63] Continuation of Ser. No. 335,444, Dec. 19, 1981, abandoned.

[30] Foreign Application Priority Data

Jan. 9, 1981 [GB] United Kingdom ................ 8100550

[51] Int. Cl.³ ............................................. F16D 65/02
[52] U.S. Cl. ............................ 188/73.38; 188/73.37
[58] Field of Search ............... 188/73.36, 73.37, 73.38, 188/250 E, 205 A; 267/61 R, 166

[56] References Cited

U.S. PATENT DOCUMENTS 4,056,174 11/1977 Weinand et al. ................ 188/73.36
4,289,217 9/1981 Heibel ............................ 188/73.38
4,290,508 9/1981 Baum .............................. 188/73.38

FOREIGN PATENT DOCUMENTS 2328773 12/1973 Fed. Rep. of Germany ... 188/73.38
2751673 5/1978 Fed. Rep. of Germany ... 188/73.38

Primary Examiner—Duane A. Reger
Assistant Examiner—Robert J. Oberleitner
Attorney, Agent, or Firm—Scrivener Clarke Scrivener and Johnson

[57] ABSTRACT

This specification discloses a friction pad assembly for use in a disc brake. The friction pad assembly has a pad anti-rattle spring having a coiled region intermediate its ends, the coils of said coiled region being axially spaced apart from each other and engaging in a slot in the backing plate, the slot and spring presenting planar surfaces which can interengage with each other. Thus, by virtue of the interengaging planar surfaces the coiled region can only, at most, rotate to a limited degree in the slot and thus, should one spring arm be broken, the planar surfaces prevent the coiled region from rotating within the slot when a force is applied to the other arm whereby that other spring arm can continue to function. Also, the location of the coiled region in the slot is space saving and the spaced apart coils allows the maximum spring performance to be achieved.

10 Claims, 5 Drawing Figures

FRICTION PAD ASSEMBLIES FOR USE IN DISC BRAKES

This application is a continuation of application Ser. No. 335,444, filed Dec. 29, 1981, now abandoned.

The present invention relates to a friction pad assembly for use in a sliding caliper disc brake.

Commonly, friction pad assemblies are supported on guides in a disc brake, the braking drag forces being transmitted from the pad assembly to the vehicle frame via the guides. Clearance is normally provided between the guides and the pad to permit the pad to slide towards and away from the disc during brake application and release. To prevent rattling of the pad on the guides it has previously been proposed to attach an anti-rattle spring in the pad assembly to bias the pad assembly against the guides.

A pad assembly incorporating an anti-rattle spring is illustrated and described in the Complete Specification of our British Patent Application No. 55727/74 (Ser. No. 1533976). The spring in this arrangement has a coiled portion and two arms extending outwardly from the coiled portion. The spring is attached to an upwardly extending projection i.e. tab, of the backing plate by a pin or rivet passing through the coiled portion of the spring. This pad assembly has proved expensive to produce because a considerable amount of backing plate material has to be scrapped during production which is by a stamping process, the provision of the projection necessitating a larger blank of material than would otherwise be required and the quality, and thus cost, of the backing plate material being necessarily high. Further, in the construction of British Patent Specification No. 1533976, the spring is free to rotate on the pin or rivet once secured to the backing plate. The pin or rivet cannot be axially compressed so as to rigidly fix the spring against such rotational movement and in any case if such compression were possible the coils of the spring are already wound so as to touch each other and the coils would thus be further compressed together increasing the friction therebetween. Such an increase in the frictional forces between the coils could impede performance. Thus the spring is maintained free to rotate on the pin or rivet. However, this can be disadvantageous as the optimum positioning of the spring when the pad assemblies are installed in a brake cannot be ensured. The spring may twist an assembly into the brake, the spring arms not registering as required. Uneven loading of the pad assembly thus occurs and incorrect sliding of the friction pads results.

Certain similar disadvantages occur with embodiments of the friction pad assembly disclosed in our copending British Patent Application No. 7930549 wherein the spring also comprises a coiled region with two outwardly extending arms, the coiled regions of the spring being engaged in a slot in the backing plate. In the out-of-use position the coiled region of the spring grips the sides of the slot securing the spring in position relative to the backing plate. However, in practice, in use, as the arms of the spring are deflected, the coiled region retaining the spring in the backing plate tends to close up and become a loose fit in the slot. Thus under adverse conditions the pad may twist relative to the spring upon operation of the brake and again uneven loading of the pad assembly can be experienced.

Both of the above described known arrangements may fail early due to incorrect positioning and thus incorrect usage of the spring. For example, if one or other of the spring arms fractures in either of the above embodiments, the spring rotates and does not provide the required bias.

In an alternative arrangement disclosed in our copending British Patent Application Nos. 48276/76 and 48277/76 (Cognated) the pad anti-rattle spring is firmly secured to the friction pad assembly by part thereof being gripped between the friction pad and the backing plate. However, problems arise due to the spring having a number of coils which are outside the periphery of the disc and which are clearly unsupported. Any spurious loading of the brake may thus result in bending or twisting of the coiled region about the portion gripped between the pad and backing plate, the spring then causing uneven loading. Further, the spring has a number of coils which are in contact and thus continued deflection of the spring gives rise to friction between the coils. The greater the number of coils the greater the problem.

The aim of the present invention is to provide a friction pad assembly wherein the pad anti-rattle spring is secured in the friction pad assembly, any possibility of the spring moving to cause incorrect loading being reduced to a minimum and frictional interaction between the coils of a coiled region of the spring being prevented.

According to the present invention there is provided a friction pad assembly for use in a disc brake comprising a backing plate to which a pad of friction material is secured, and a pad anti-rattle spring having a coiled region intermediate its ends, the coils of said coiled region being axially spaced apart from each other and engaging in a slot in the backing plate, the slot and spring presenting planar surfaces which can interengage each other.

Thus, in a friction pad assembly constructed according to the present invention, the spring coils do not contact each other to impair the spring performance and when said planar surfaces on slot and spring interengage each other, the spring is held firmly against rotation even if one of the spring arms breaks. If a spring arm breaks in a prior art arrangement the spring rotates and becomes inoperative. Further, as the spring cannot rotate, the spring is located in its optimum position within the brake during installation.

Preferably there is a small clearance between the planar surfaces on the spring arms and in the slot, this clearance allowing the spring to rotate to a limited degree about the axis of the spring coils to thus enable the spring to adjust its position during installation to cater for manufacturing tolerances. Alternatively the planar surfaces of the spring and slot may be designed to permanently interengage each other to thus hold the spring firmly in position at all times.

In a preferred embodiment of the present invention the friction pad assembly has a backing plate with an arcuate slot, centrally located in what is, in use, the upper edge of the backing plate. The slot has a narrow opening which widens out with planar surfaces interconnected by a curved base wall. The slot region is free of friction material so that the spring can be inserted into the slot after the pad of friction material has been secured to the backing plate. The spring has a coiled region and two outwardly directed spring arms which extend in generally opposite directions from opposite ends of the coiled region. The coiled region preferably comprises one complete coil and a half coil at each end, the coiled region being secured in the slot by a rivet which passes therethrough, with said coils spaced apart from each other. The half coils each have an end portion which presents a surface which engages or can engage the planar portion of the slot to prevent rotation of the spring coil on the slot and thus maintains the positions of the spring arms and maintains the spring operative should one arm become broken. The spring arms are connected to said end portions of said respective half coils by bent regions which enable the spring arms to follow substantially the median line of the backing plate. Thus the spring will not bias the friction pad assembly to a tilted position.

The present invention will now be further described, by way of example, with reference to the accompanying drawings, in which.

Figure 1:
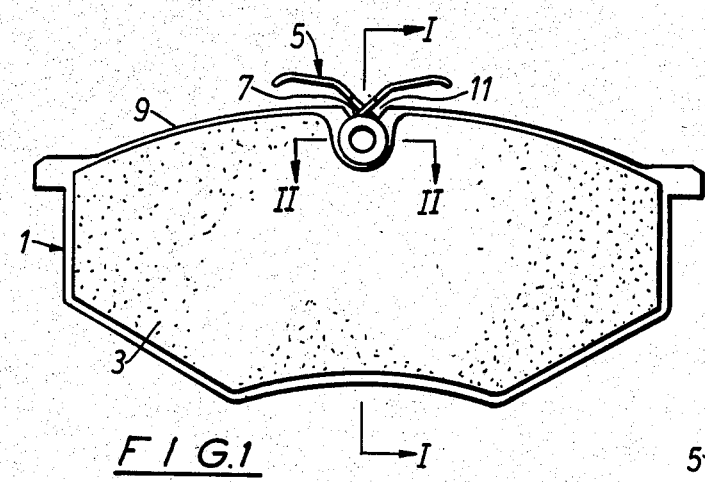
FIG. 1 is a front view of a preferred embodiment of the present invention.
Figure 2:
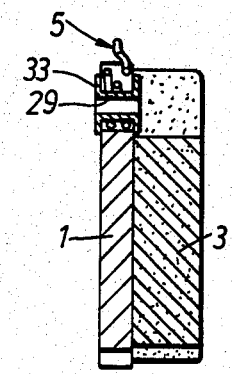
FIG. 2 is a cross-sectional view along line I—I.

The friction pad assembly constructed in accordance with the present invention and illustrated in the accompanying drawings comprises a backing plate 1 to which a pad 3 of friction material is secured, and a pad anti-rattle spring generally designated 5.

The backing plate 1 has a slot 7 centrally located in what is, in use, its upper edge 9. The slot 7 has a narrow opening 11 which widens with generally planar surfaces 13, an arcuate base surface 15 interconnecting said planar surfaces 13 to thus complete the slot 7. The importance of these planar surfaces 13 is discussed later.

Figure 4:
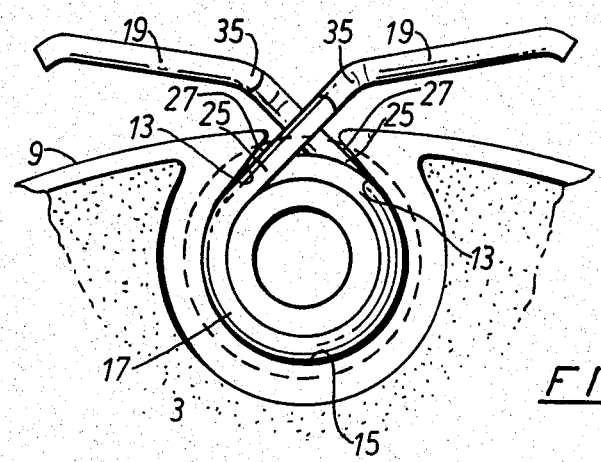
FIG. 4 is an enlarged view of the spring attachment in FIGS. 1 to 3.

The spring 5 has a coiled region 17 from which two generally oppositely directed spring arms 19 extend. The coiled region 17 comprises a complete coil 21 and two half coils 23, though alternatively any suitable number of complete coils 21 may be provided between the half coils. The main criterion is that the complete and half coils do not contact each other to impair spring performances as can happen due to the frictional forces when the coils interengage. The half coils 23 each extend as portions 25 (see FIG. 4) having a planar surface or edge 27 which can engage flush with planar surface 13 of the slot 7, coiled region 17 being located in the slot.

A small clearance is provided between planar surfaces 27 and 13 on the spring a slot respectively, this clearance allowing the coiled region 17 to rotate about its axis to a limited degree during installation of the friction pad assembly, enabling the spring to adjust itself to cater for manufacturing tolerances. In contrast, the spring may be designed to permanently interengage planar surfaces 27 and 13, to thus firmly secure the spring in the slot in a fixed position.

Figure 5:
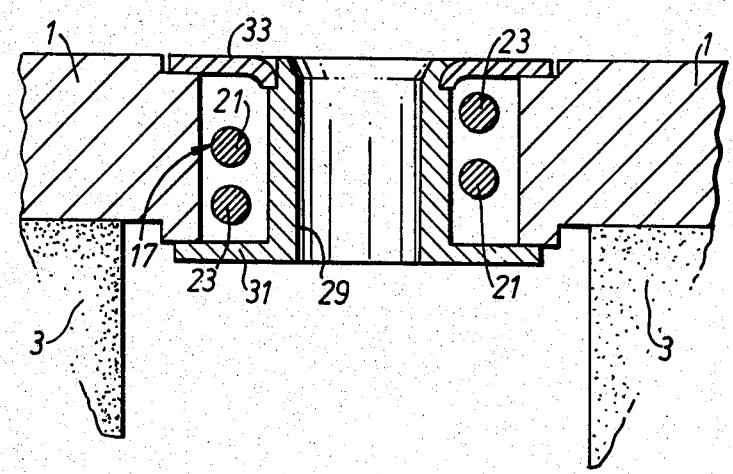
FIG. 5 is an enlarged cross-sectional view along the line II—II in FIG. 1.

To facilitate attachment of the spring 5 to the backing plate 1, the region of the backing plate around slot 7 is free of friction material so that coiled region 17 can be merely slid into slot 7. To secure the spring 5, a rivet 29 is provided (see FIG. 5), which passes through coiled region 17, a rivet head 31 engaging one side of the backing plate 1 and a washer 33 secured by the peened-over edge of the rivet, engaging the other side of the backing plate 1 to secure the spring therebetween.

By virtue of spring portions 25 engaging planar surfaces 13 of slot 7, the spring cannot rotate more than a limited amount, in slot 7, and even when spring arms 19 are deflected during installation of the pad assembly in a brake, half coils 23 cannot move over surfaces 13 when interengaged therewith, so that coiled region 17 is again prevented from rotating. Thus the spring can be installed in a brake in the optimum position without fear of the spring twisting to cause uneven loading. Further, if one spring arm 19 should fracture the spring will continue to function as required with only one spring arm, the coiled region 17 being maintained in position in the slot 7.

Figure 3:
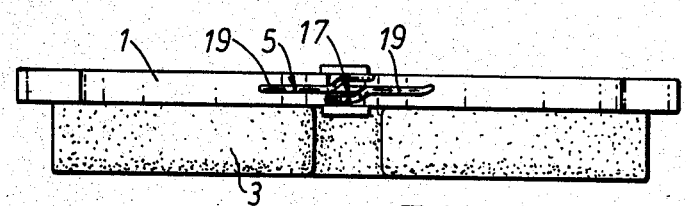
FIG. 3 is a plan view of the embodiment of FIGS. 1 and 2.

In the illustrated embodiment spring arms 19 are cranked towards the centre line of the backing plate 1 (see FIG. 3) and then cranked again at 35 (see FIG. 4) to follow the centre line, thus preventing the spring from tilting the pad assembly on its guides during use.

The present invention thus provides a friction pad assembly for a disc brake, wherein the spring is firmly held against rotation so that the attached spring is located in the optimum position when the pad assembly is installed in a brake. Further, should one arm of the spring break, when a force is applied to the other arm the coiled region is prevented from rotating within the slot and the spring will still function. Also, the spring coils are 'open' i.e. spaced apart, so that spring performance is not impaired due to frictional forces between adjacent coils.

We claim:

1. A friction pad assembly for use in a disc brake comprising a backing plate to which a pad of friction material is secured, a slot centrally located in what is, in use, the upper edge of the backing plate, said slot having a narrow opening having laterally spaced sides and widening out with a curved base wall interconnecting the sides of said opening, an anti-rattle spring having a coiled region comprising a plurality of coils received in said slot and a pair of outwardly extending arms extending through said opening in generally opposite directions from opposite ends of said coiled region, a portion of each arm being adjacent to a respective side of said opening and including a planar surface engageable with a part of said slot the planar surface of one arm preventing said coiled region from rotating within said slot when a force is applied to the other arm of said spring.

2. A friction pad assembly according to claim 1, wherein said slot has planar surfaces engageable by the planar portions of said arms of said spring.

3. A friction pad assembly according to claim 1, wherein the region of the backing plate, in which the slot is formed, is free of friction material.

4. A friction pad assembly according to claim 3, wherein the spring arms are each connected to the coiled region of the spring by cranked regions which enables the spring arms to lie substantially in the plane of the backing plate.

5. A friction pad assembly according to any one of the preceding claims, wherein the coiled region of the spring comprises one complete coil and a half coil at each end.

6. A friction pad assembly according to any one of claims 2 to 4, wherein the coiled region of the spring has a half coil at each end, the half coils each extending into a portion of an arm which includes said planar surface engageable with a part of said slot.

7. A friction pad assembly according to any one of claims 1 to 4, wherein the coiled region of the spring is secured in the said slot, by a rivet which passes therethrough.

8. A friction pad assembly for use in a disc brake, and a pad anti-rattle spring having a coiled region intermediate its ends, the coils of said coiled region being axially spaced apart from each other, a slot in the backing plate having a narrow opening extending through the upper edge of the backing plate and a widened out portion extending downwardly in said backing plate from said opening, the widened out portion of the slot being arcuate, the coiled region of said spring being complementarily received in said widened out portion, said spring having two outwardly directed spring arms which extend outwardly of said narrow opening in generally opposite directions from axially extreme parts of opposite end portions of said coiled region of said spring, said spring having substantially planar surfaces on said end portions a planar surface of one end portion carrying one arm being engageable with a part of said slot to prevent rotation of said coiled region in said slot when a force is applied to the other of said arms.

9. A friction pad assembly according to claim 8, wherein said planar surfaces which engage parts of said slot are located at least at the axially extreme parts of said spring.

10. A friction pad assembly for use in a disc brake, and a pad anti-rattle spring having a coiled region intermediate its ends, the coils of said coiled region being axially spaced apart from each other, a slot in the backing plate having a narrow opening extending through the upper edge of the backing plate and a widened out portion extending downwardly in said backing plate from said opening, the widened out portion of the slot being arcuate, the upper part of said widened out portion being joined to said narrow opening by planar surfaces, the coiled region of said spring being complementarily received in said widened out portion, said spring having two outwardly directed spring arms which extend outwardly of said narrow opening in opposite direction from opposite ends of the coiled region of said spring, said arms of said spring having planar surfaces engageable with said planar surfaces of said slot, a planar surface of one arm being engageable with a planar surface of said slot and having an extent which prevents rotation of said coiled region in said slot when a force is applied to the other one of said arms.

* * * * *